Jan. 23, 1962   S. J. BECKER ETAL   3,017,977
TRANSMISSION
Filed Jan. 27, 1958   2 Sheets-Sheet 2
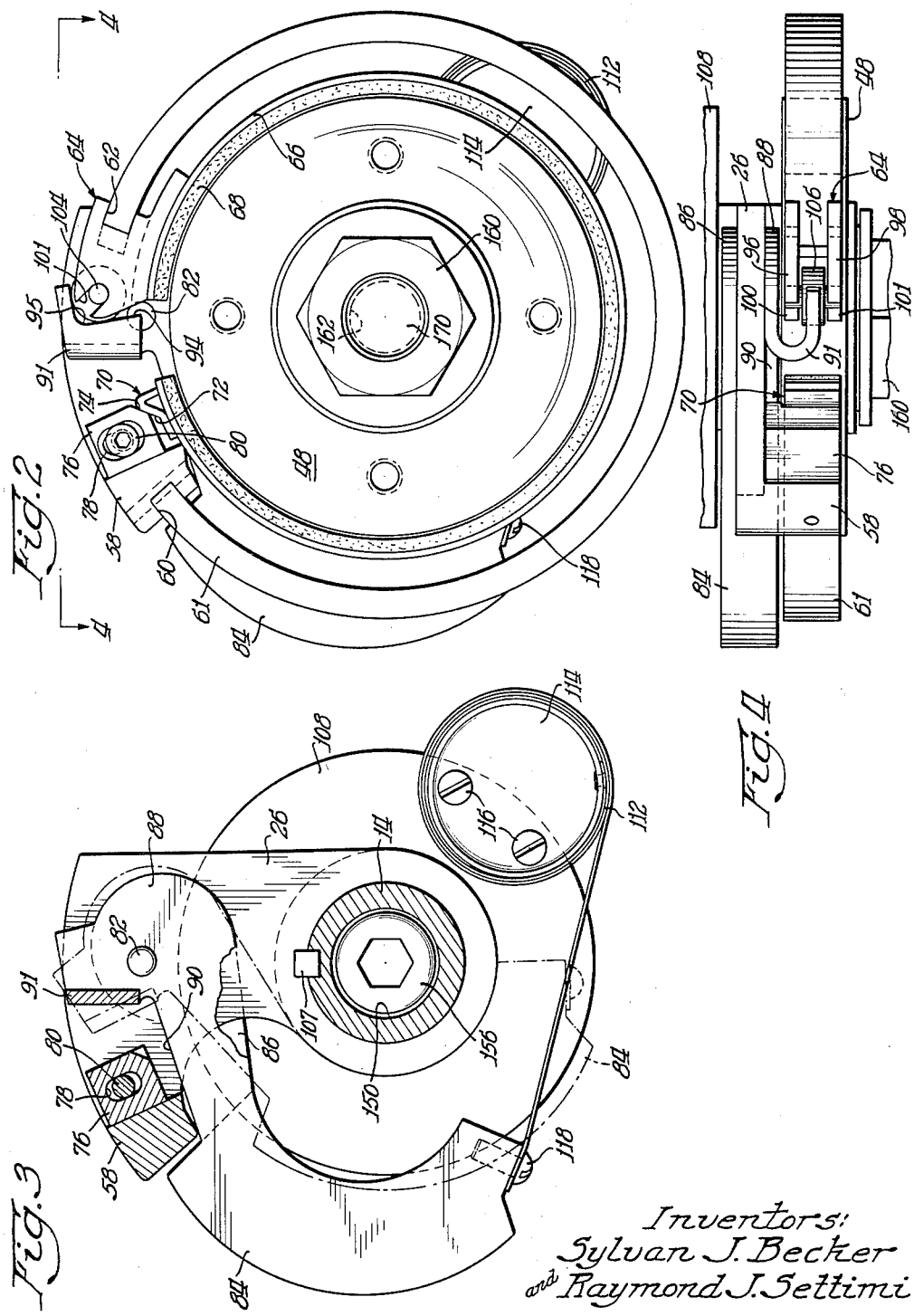
Inventors:
Sylvan J. Becker
and Raymond J. Settimi
By: Spancis T. Drumm   Atty United States Patent Office 3,017,977
Patented Jan. 23, 1962

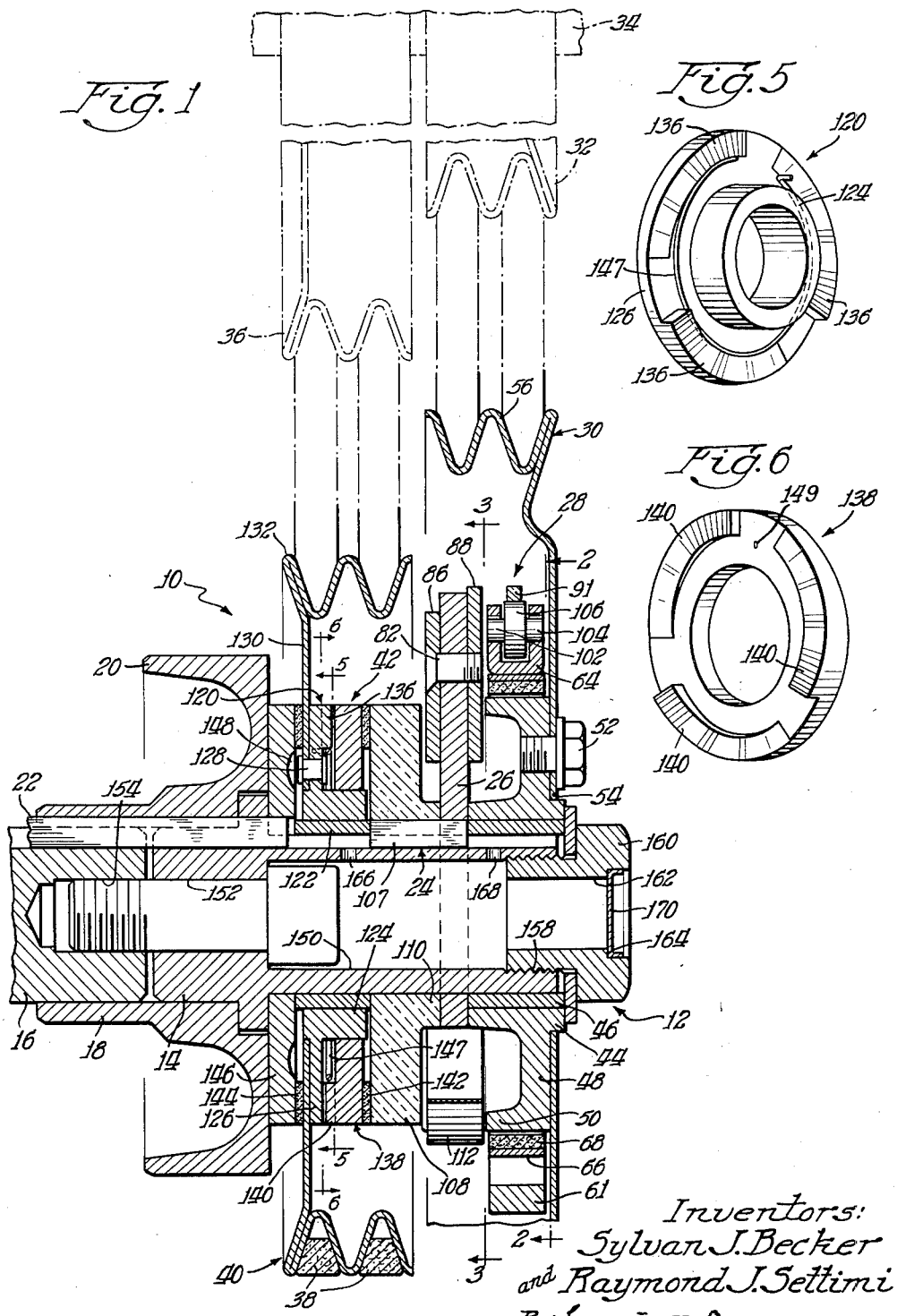

3,017,977
TRANSMISSION
Sylvan J. Becker, Lombard, and Raymond J. Settimi, Bellwood, Ill., assignors to Borg-Warner Corporation, Chicago, Ill., a corporation of Illinois
Filed Jan. 27, 1958, Ser. No. 711,319
8 Claims. (Cl. 192—48)

This invention relates to power transmissions and more particularly to a multiple speed accessory drive for motor vehicles.

A primary object of the invention is to provide an accessory drive for motor vehicles and the like which is capable of operating the vehicle accessories faster than engine speed at relatively low engine speed and slower than engine speed at relatively high engine speeds.

A further object of the invention is to provide an accessory drive for motor vehicles which is characterized by ease and facility of manufacture, compactness and relatively light weight.

Another object of the invention is to provide an accessory drive for motor vehicles which is readily connectible to the vehicle engine without alterations and which is characterized by reliability in use.

A further object of the invention is to provide an accessory drive for motor vehicles wherein there is provided an input member and a pair of output members, one of the output members at relatively low engine speeds being operable to maintain the other of said output members in overrunning relation with respect to the input member, the first of the output members being disengageable when the engine speed reaches a predetermined value, and the second of the output members being drivingly connected to the input member when the first output member is disengaged.

Another object of the invention is to provide a transmission of the stated type which replaces the conventional drive pulley and which may be made integral with the conventional harmonic balancer.

Another object of the invention is to provide an accessory drive of the mentioned character in which the first output member is driven at low engine speed by means of a centrifugally responsive clutch employing a novel self-energizing arrangement.

A further object of the invention is to provide a multiple speed accessory drive having an input shaft, a first output member, and a second output member, wherein the second output member is normally maintained in overrunning relation with respect to the input shaft by means of a one-way clutch which includes two sections relatively movable axially for drivingly connecting the input shaft to the second output member when the first output member is disengaged upon rotation of the input shaft at a speed above a predetermined level.

A further object of the invention is to provide an accessory drive of the stated type wherein the driving connection of the second output member is afforded by a pair of axially spaced friction surfaces, wherein the amount of axial force developed is limited only by the amount required to effect lock up, and wherein engagement may be afforded even in the event that the friction surfaces are worn.

Another object of the invention is to provide a vehicle accessory drive of the type described in which the sections of the one-way clutch are resiliently biased in the direction of engagement.

A further object of the invention is to provide a multiple speed accessory drive of the type described wherein the first output member is connected to the input shaft by a band clutch assembly which comprises a substantially annular split shoe which is self-energizable so that engagement is readily effected when the speed of the input shaft falls below a predetermined value and wherein the first output member is maintained in rotation during all vehicle speeds.

Another object of the invention is to provide a multiple speed accessory drive of the type described wherein the first output member is at low vehicle speeds drivingly connected to the input member by a clutch having a floating shoe which engages the first output member equally when the vehicle speed decreases.

A further object of the invention is to provide a multiple speed accessory drive wherein the first output member is driven through the medium of a clutch of the band type having a resilient shoe which may be moved radially outwardly equally in all directions in response to centrifugal force and which may be moved in a similar manner in the opposite direction when the centrifugal force drops below a predetermined value.

Another object of the invention is to provide a multiple speed accessory drive of the mentioned type wherein a centrifugally responsive arm effects disengagement of the first output member under predetermined centrifugal force conditions.

A further object of the invention is to provide an accessory drive for motor vehicles and the like which is effective even under extreme wear conditions and which is characterized by the ability effectively to drive accessories even in the event of failure of one of the other of the clutches.

A more particular object of the invention is to provide an accessory drive for automotive vehicles having an input member adapted to be driven by the vehicle engine, a first output member, a second output member, and an output shaft, wherein a centrifugally responsive clutch drivingly connects the input member with the first output member at relatively low engine speeds, and wherein the first output member, when engaged, drives the second output member in overrunning relation to the input shaft so that upon disengagement of the first output member the output shaft is driven by the second output member at a different speed.

This invention consists of the novel constructions, arrangements, and devices to be hereinafter described and claimed for carrying out the above stated objects and such other objects as will be apparent from the following description of preferred forms of the invention, illustrated with reference to the accompanying drawings, wherein:

FIGURE 1 is an elevational sectional view, partly broken away, of a multiple speed accessory drive made in accordance with the present invention;

FIGURE 2 is a vertical end view taken substantially on line 2—2 of FIGURE 1;

FIGURE 3 is a view similar to FIGURE 2 but taken substantially on line 3—3 of FIGURE 1;

FIGURE 4 is a fragmentary plan view taken substantially on line 4—4 of FIGURE 2;

FIGURE 5 is a view in perspective of one of the sections of the one-way clutch utilized at low vehicle speeds to maintain the second output member in overrunning relation with respect to the input shaft; and FIGURE 6 is a view in perspective of the other of the overrunning clutch sections.

Referring now to the drawings and more particularly to FIGURE 1, the transmission of the present invention is indicated generally by reference numeral 10, and includes an input member 12 comprising an input shaft 14, illustrated as connected to the front end of an engine crankshaft 16 by means of a sleeve 18 forming a part of a harmonic balancer 20. The sleeve 18 may be splined as at 22 to assure a driving connection between the crankshaft 16 and the input shaft 14 of the present transmission. Fixed to the shaft 14 at 24, as by keying or the like, is a driving arm 26 which imparts rotary motion to band clutch assembly 28 which, at low vehicle speeds, drives a first output member 30, which, in the present instance, takes the form of a double pulley. The pulley 30, at low vehicle speeds, drives a pulley 32 of less diameter which is affixed to an output shaft 34. Thus the shaft 34, which may be the water pump shaft, for instance, is driven at a speed faster than engine speed at low vehicle speeds. Affixed to the shaft 34 is a second pulley 36, larger in diameter than the pulley 32. The pulley 36 drives at low vehicle speeds, by means of suitable belting 38, a second output member 40 which, in this instance, takes the form of a double sheave or pulley. In the low speed range, the pulley 40 is maintained in overrunning relation to the shaft 14 by means of the output member 30 through the medium of an overrunning clutch 42.

According to the present invention, as will be hereinafter apparent, the band clutch assembly 28 is disengageable at a predetermined speed level of the shaft 14 so that the speed of the shaft 34 drops below the speed of the shaft 14, the clutch 42 is engaged, and the shaft 34 is then driven by the output member 40 at a speed less than the speed of the input shaft 14.

Referring now more particularly to FIGURE 1, the output member 30 includes a hub 44 journalled on a sleeve type bearing 46, desirably of porous bronze or the like. Integrally formed with the hub 44 is a radially outwardly extending flange 48 and an axially extending flange 50, the outer periphery of which forms a drum for the clutch assembly 28, as will be apparent. Secured to the flange 48 by means of a plurality of circumferentially spaced machine screws 52 is a radially inwardly extending flange 54 forming a part of a stamped double sheave 56.

As shown best in FIGURES 2, 3 and 4, the driving arm 26 is provided at its outer end with an integrally formed retainer block 58 having an axially extending slot 60 for reception of one end of a spring band 61. The other end of spring band 61 is received in a similarly formed slot 62 in a retainer block 64 which is secured, as by welding or the like, to one end of a substantially annular resilient shoe 66 having at the innerface thereof a friction facing 68. The entire inner periphery of friction facing 68, in the engaged position of the clutch assembly 28, is urged into engagement with the periphery of the drum 50. At the other end of the shoe 66 is a return bent portion 70 having a cam surface 72 engageable by a correspondingly formed cam surface 74 of an adjusting block 76 which is provided with an elongated radially extending slot 78 having a stepped bore for reception of an Allen head screw 80, the head of which frictionally engages the bore step. In the event of wear of the facing 68 the cam block 76 may be moved radially inwardly, after loosening the screw 80, to bring the cam surface 74 into operative relation to the cam surface 72 of the return bent portion 70.

Pivotally mounted on the driving arm 26 about a pin 82 is a centrifugally responsive arm 84 which is movable from the position shown in dot-and-dash lines in FIGURE 3 to the position shown in solid lines under centrifugal force conditions. The inner end of the arm 84 is bifurcated to form a pair of arms 86, 88, one on each side of the driving arm 26. The arm 88 has an irregular recess 90 defining a tab 91 which is return bent into a U-shaped configuration with one arm of the return bent tab coplanar with the arm 88 and the other arm of the return bent tab extending in parallelism therewith and having an undercut recess 94 defined by a curved edge 95.

The retainer block 64 is bifurcated to form spaced parallel arms 96 and 98. The arms 96 and 98 are provided with angularly extending slots 100 and 101 respectively in which are received trunnions 102, 104 of a roller 106. The roller 106 is engaged by the edge 95 and a component of force is exerted in a direction parallel to the axis of the slots 100 and 102. Driving force is transmitted from the return bent tab of the arm 88 through the retainer block 64 through the retainer block 58 and through the spring ring 61. At the same time, driving force is exerted against the cam surface 72 to urge the friction facing 68 into engagement with the periphery of the drum 50.

Upon movement of the arm 84 to the position shown in solid lines in FIGURE 3, the spring ring 61 is spread by the edge 95 of the tab 91, thus permitting the shoe 66 to expand to the disengaged position illustrated.

By the above described arrangement, the shoe 66 is biased, at low vehicle speeds, into engagement with a drum 50 at two separate points. Thus, the friction facing 68 moves in a radially inwardly direction at an equal rate throughout the circumference of the facing 68 when the centrifugal arm 84 is returned to the position shown in dot-and-dash lines in FIGURE 3.

Fixedly mounted on the input shaft 14, by means of a key 107 is a drive ring 108 forming a part of the overrunning clutch 42. The ring 108 is provided with an axially extending flange or annular boss 110 which is shown as being in abutting relation to the driving arm 26. By this arrangement, adequate room is provided to assure free operation of the centrifugal arm 84, movement of which is controlled by a constant rate spring 112 having a housing 114 secured to the adjacent face of the ring 108 by means of machine screws 116. The free end of the spring 112 is secured to the free end of the centrifugal arm 84 by means of a machine screw 118. The spring 112 functions not only to return the centrifugal arm 84 to the position shown in dot-and-dash lines at a constant rate but also deters outward movement of the arm until sufficient centrifugal force is accrued to assure positive action of the tab 91 against the roller 106 to afford disengagement of the friction surface 68 from the drum 50.

The clutch 42 includes a first section 120 journalled on a sleeve type bearing 122 of porous bronze or the like. The section 120 is axially slidable on the bearing 122. The section 120 includes an axially elongated hub 124 and a radially outwardly extending flange 126 which is offset from the left edge of the hub 124, as viewed in FIGURE 1. Secured to the flange 126 by means of a plurality of circumferentially spaced rivets 128 is a radially inwardly extending flange 130 of a double sheave 132, forming a part of the output member 40. It will be noted that the inner marginal edges of the flange 130 extend into close proximate relation to the step formed by the offsetting of the flange 126. At the right side of the flange 126, as seen best in FIGURE 5, are a plurality of integrally formed ramps 136. The clutch 42 includes a second section 138 in the form of an annulus surrounding the hub 124 and axially slidable with respect thereto in a manner hereafter apparent. A plurality of ramps 140 are formed integrally with the confronting surface of the section 138 so that they are, when the sheave 132 is overrunning, in mating relation to the ramps 136 of the first section 120. When the clutch assembly 28 is disengaged by movement of the arm 84 to its outermost position, the overrunning relationship of the sheave 132 with respect to the shaft 14 is terminated and a driving connection is afforded when the ramps 140 advance upon the ramps 136. To this end, a friction facing 142 is secured to the outer marginal edge of the confronting face of the ring 108, and a similar ring 144 is secured to the outer marginal edge of the confronting face of a spacer ring 146. An annular recess 148 is formed in the confronting face of the spacer ring 146 to assure ample clearance for the heads of the rivets 128 in the event that the friction facing 144 wears.

Assuming clockwise rotation of the shaft 14, as viewed from the right in FIGURE 1, the ramps 136 and the ramps 140 are in mating relation and no power can be transmitted when the first section 120 attached to flange 130 of sheave 132 overruns the input shaft 14. When, however, the speed of the first section 120 drops below the speed of the input shaft 14, relative rotation occurs between the sections 120 and 138 because of the inertia in the section 138 and the torsional force of the spring 147 which assists in turning section 138 clockwise relative to section 120 when viewed from the right of FIG. 1. Thus, as the ramps 136 advance relatively counterclockwise with respect to the ramps 140, sections 120 and 138 move apart relatively to each other along the axis of the shaft 14, that is, relative axial movement is afforded with the result that the flange 130 is urged into engagement with the friction surface 144 and the second section 138 is urged into contact with the friction facing 142. Power is thus transmitted through the ring 108, the second section 138, the first section 120, the sheave 132, the belting 38, and the sheave 36 to the shaft 34. A spring 147 is interposed between and connected to each of the sections 120 and 138 so that these two sections 120 and 138 are constantly energized by the spring 147 in the direction of lock-up. This assures immediate response to the reduction of speed of the shaft 34. The spring 147 produces a limited frictional effect on the friction surfaces 142 and 144 so that the lock-up of the clutch 42 is instantaneous. It will be apparent that the clutch 42 is self-energizing in that the greater the load the greater the lock-up force and a force required to effect relative axial movement of the sections 120 and 138 is provided by the relative rotational movement of these elements. An opening 149 in section 138 accommodates an axially extending projection of the spring 147 to anchor the spring 147 to section 138. Similar means may be used to anchor the other end of the spring 147 to section 120. The engagement of the clutch 42 is controlled so that no jarring occurs and yet there is a minimum of lag before the output member 40 assumes the load.

The input shaft 14 is shown as provided with a bore 150 and a threaded counterbore 152 in register with a correspondingly threaded bore 154 in the confronting end of the crankshaft 16. A machine screw 156 is received in the bores 152 and 154 to preclude relative axial movement between the crankshaft 16 and the input shaft 14. The inner wall defining the bore 150 is threaded at 158 for reception of a cap 160 having a stepped bore 162 forming a shoulder 164. The bearings 46 and 122 may be lubricated by grease packed within the bore 150 and passing into the keyway receiving the key 107 by means of axially spaced openings 166 and 168. The grease is thus made available to the porous bronze bearings 46 and 122 by centrifugal force and by capillary action when the inner peripheries of the hubs 124 and 44 heat to a predetermined degree. Thus, the lubrication available to the hubs 44 and 124 is only that amount sufficient for lubrication purposes and excess lubricant is unable to reach the friction facings 142 and 144.

It will be apparent that a relative rotational movement of the sections 120 and 138 takes place only to the extent required to afford the requisite axial movement of these elements. In the event of wear of the friction facings 142 and 144, progressively greater relative rotational movement will occur to afford additional axial movement of these elements as required. In fact, the clutch 42 is operative to effect metal-to-metal engagement of the flange 130 with the spacer ring 146, and the section 138 with the ring 108, if necessary.

The above-described accessory transmission is characterized by a high degree of reliability in use. For instance, in the unlikely event that the clutch 28 fails to engage, the vehicle accessories may be safely driven by the pulley 40 at a temporarily feasible speed. If the clutch 28 fails to release, which is also unlikely, the centrifugal forces always acting on the spring ring 61 and the shoe 66 tend to effect disengagement even in the absence of the force supplied by the arm 84. Also, if the clutch 42 fails to release, which is improbable since the clutch 28 overruns it, the result would be a tug-of-war at engine speeds below the shift point for the task of driving the accessories. This tug-of-war would not seriously effect the life of either of the clutches. As mentioned previously, the ramps of the clutch 42 are so designed as to afford only sufficient axial force to effect lock up, and, as the friction facings 142 and 144 wear, the axial displacement of the clutch sections 120 and 138 increases as required.

The lubrication arrangement of the present invention assures effective lubrication under all conditions of use over long periods of time. The bronze bearings 122 and 46 are preferably of a porosity in the neighborhood of 16 percent so that the flow of lubricant to the surfaces of the hubs 44 and 124 is assured when required. The grease may be sealed in the bore 150 by means of a retainer cup 170. The cap 160 functions to retain the several elements of the present transmission in the assembled relations shown. The presence of the imperforate pulley flange 54 at the front of the present transmission prevents the admission of foreign matter into the interior of the unit. The spring ring 147 is desirably of the torsion type and, as mentioned previously, functions to supply only enough bias to the sections 120 and 138 to assure rapid engagement.

While we have described our invention in connection with certain specific constructions and arrangements it is to be understood that this is by way of illustration and not by way of limitation and the scope of our invention is defined solely by the appended claims which should be construed as broadly as the prior art will permit.

This application is a continuation-in-part of applicants' copending application S.N. 694,825, entitled Transmission, filed November 6, 1957.

We claim:

1. A two speed transmission for automotive accessories comprising an input shaft, a first output member, a clutch for drivingly connecting said first output member to said input shaft at relatively low vehicle speeds, a second output member adapted to be drivingly connected to said input shaft at relatively high vehicle speeds, a second clutch interposed between said second output member and said shaft, said second clutch being maintained at relatively low vehicle speeds in overrunning relation with respect to said shaft by said first output member, said first clutch being disengageable at a predetermined vehicle speed, driving means mounted on said input shaft, said second clutch comprising two sections rotatably mounted on said input shaft and relatively movable axially to establish a driving relation between said shaft and said second output member when said first clutch is disengaged, and ramp means on each of said sections for effecting said relative axial movement means connecting said two sections for effecting initial engagement between said driving means connected to said input shaft and said output member.

2. A transmission for accessory drive in automotive vehicles and the like comprising an input shaft adapted to be rotated at engine speed, a first output member rotatably mounted on said shaft, a clutch normally drivingly connecting said output member to said input shaft, said clutch being disengageable when the speed of the input shaft reaches a predetermined value, a second output member rotatably mounted on said shaft, driving means mounted on said input shaft for driving said second output member a one-way clutch connecting said second output member to said shaft, said first output member being operable at low engine speeds to rotate said second output member faster than said input shaft so that said one-way clutch overruns, said one-way clutch being engageable when said first-named clutch is disengaged and when the speed of the input shaft exceeds the speed of said second output member, said one-way clutch comprising two sections relatively movable axially along said shaft axis when the overrunning relation of said second output member is terminated, and means connecting each of said sections for effecting initial engagement between said driving means connected to said input shaft and said second output member.

3. An accessory drive for automotive vehicles comprising an input member adapted to be driven by the vehicle engine, a first output member, a second output member, an output shaft, a clutch drivingly connecting said input member with said first output member at relatively low engine speeds so that said output shaft is driven at a speed greater than the speed of said input member, driving means mounted on said input member for driving said second output member a one-way clutch for connecting said second output member to said input shaft by drivingly connecting said driving means and said second output member, said second output member at relatively low engine speeds being maintained in overrunning relation with respect to said input shaft by means of said first output member and said output shaft, centrifugal responsive means operative upon actuation to disengage said first-named clutch so that the overrunning relation of said second output member is terminated and the load of said output shaft is assumed by said second output member, said one-way clutch comprising two annular complementary ramp-like sections relatively movable axially to each other along said input member axis to afford a driving connection between said driving means on said input member and said second output member when said first-named clutch is disengaged, and means for returning said centrifugally responsive means to its rest position when the speed of the input shaft decreases, said last-named means including a constant rate spring.

4. A two speed transmission for automotive vehicle accessories comprising an input shaft, a driving arm fixed to said input shaft, a first output pulley, said first output pulley having a hub rotatably mounted on said input shaft, a first clutch adapted drivingly to connect said first output pulley to said input shaft at low vehicle speeds, means responsive to centrifugal force for disengaging said first clutch at a predetermined vehicle speed, said means including a centrifugal arm pivototally mounted on said driving arm, spring means for retarding outward movement of said centrifugal arm until a predetermined centrifugal force is reached and for returning said centrifugal arm to its rest position, a second output pulley, and an overrunning clutch for selectively drivingly connecting said second output pulley to said input shaft upon disengagement of said first clutch, said second-named clutch including a ring fixed to said input shaft, and a pair of annular sections having complementary ramp-like portions, said section being relatively movable axially upon relative circumferential displacement to effect a driving relation between said ring and said second output pulley.

5. A transmission in accordance with claim 1 wherein said input shaft is provided with a bore for reception of lubricant and wherein the wall defining the bore is provided with a pair of axially spaced openings for flow of lubricant to said first output member and said second output member.

6. A transmission in accordance with claim 1 wherein said first output member and said second output member are journalled on porous bronze bearings and wherein said input shaft is provided with a hollow bore for reception of lubricant and a plurality of axially spaced openings affording communication between said bore and said bearings.

7. A two speed transmission for automotive accessories comprising an input shaft, a first output member, a clutch for drivingly connecting said first output member to said input shaft at relatively low vehicle speeds, a second output member adapted to be drivingly connected to said input shaft at relatively high vehicle speeds, a second clutch interposed between said second output member and said shaft, said second clutch being maintained at relatively low vehicle speeds in overrunning relation with respect to said shaft by said first output member, said first clutch being disengageable at a predetermined vehicle speed, said second clutch comprising two annular sections rotatably disposed on said input shaft and relatively movable axially with respect to each other and said shaft to afford a driving relation between said shaft and said second output member when said first clutch is disengaged, one of said sections being connected with said output member, each of said sections having a plurality of circumferentially spaced ramps, the ramps of one section being engageable with the ramps of the other section when the overrunning relation of said second clutch is terminated by the disengagement of said first clutch.

8. A two speed transmission for automotive accessories comprising an input shaft, a first output member, a clutch for drivingly connecting said first output member to said input shaft at relatively low vehicle speeds, a second output member adapted to be drivingly connected to said input shaft at relatively high vehicle speeds, a second clutch interposed between said second output member and said shaft, said second clutch being maintained at relatively low vehicle speeds in overrunning relation with respect to said shaft by said first output member, said first clutch being disengageable at a predetermined vehicle speed, said second clutch comprising two sections rotatably disposed on said input shaft and relatively movable axially to each other to afford a driving relation between said shaft and said second output member when said first clutch is disengaged, one of said sections being connected to said second output member and having an axially extending hub and a plurality of circumferentially spaced ramps, the other of said sections being dimensioned for axial sliding movement on the hub of said one of said sections and having a corresponding number of circumferentially spaced ramps in confronting relation to the ramps of said one section whereby relative axial movement between said clutch sections is afforded and said second output member is drivingly connected to said input shaft when said first clutch is disengaged and the overrunning relationship of said second output member is terminated.

References Cited in the file of this patent

UNITED STATES PATENTS

| | | |
|---|---|---|
| 561,028 | Perry | May 26, 1896 |
| 1,979,077 | Pilaar | Oct. 30, 1934 |
| 1,983,827 | Winther et al. | Dec. 11, 1934 |
| 2,482,460 | Browne | Sept. 20, 1949 |
| 2,526,049 | Schroeder | Oct. 17, 1950 |
| 2,633,949 | Lavash | Apr. 7, 1953 |
| 2,675,898 | Morgan | Apr. 20, 1954 |
| 2,694,175 | Davis | Nov. 9, 1954 |
| 2,694,937 | Birbaum | Nov. 23, 1954 |
| 2,833,536 | Joachim et al. | May 6, 1958 |
| 2,866,349 | Heckethorn | Dec. 30, 1958 |